US011212807B2

(12) United States Patent
Kubota et al.

(10) Patent No.: US 11,212,807 B2
(45) Date of Patent: Dec. 28, 2021

(54) SERVICE-BASED CELL SELECTION AND RESELECTION

(71) Applicant: QUALCOMM INCORPORATED, San Diego, CA (US)

(72) Inventors: Keiichi Kubota, San Diego, CA (US); Gavin Bernard Horn, La Jolla, CA (US); Chih Ping Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/714,486

(22) Filed: Dec. 13, 2019

(65) Prior Publication Data

US 2020/0120661 A1 Apr. 16, 2020

Related U.S. Application Data

(62) Division of application No. 15/017,476, filed on Feb. 5, 2016, now Pat. No. 10,542,547.

(Continued)

(51) Int. Cl.
*H04W 72/04* (2009.01)
*H04W 72/10* (2009.01)
(Continued)

(52) U.S. Cl.
CPC ......... *H04W 72/048* (2013.01); *H04W 36/22* (2013.01); *H04W 48/16* (2013.01);
(Continued)

(58) Field of Classification Search
CPC ... H04W 48/16; H04W 72/042; H04W 48/20; H04W 48/08; H04W 48/10; H04W 48/18
See application file for complete search history.

(56) References Cited

U.S. PATENT DOCUMENTS 9,131,418 B2  9/2015  Klingenbrunn et al.
2004/0192313 A1  9/2004  Otting
(Continued)

FOREIGN PATENT DOCUMENTS

CN  101005693 A  7/2007
CN  101730199 A  6/2010
(Continued)

OTHER PUBLICATIONS

European Search Report—EP19151661—Search Authority—Munich—dated Apr. 25, 2019.
(Continued)

*Primary Examiner* — Nam T Huynh
(74) *Attorney, Agent, or Firm* — Haynes and Boone, LLP

(57) ABSTRACT

Systems and techniques are disclosed for selecting service-specific cells that considers additional information about service availability at the cells. A base station stores service availability information in system information. A UE searching for a service-specific cell on which to camp receives the system information with service availability. The UE analyzes its service requirements against the service availability as well as measured radio conditions and selects a cell that enables service-specific support on which to camp. When a change occurs to availability of the service support at the base station, it notifies the camped UE of the change and the UE obtains the changed system information to determine whether to reselect a different cell on which to camp. When a service-specific cell is not available, the UE may select a suitable cell for normal service and periodically perform cell reselection in an attempt to again camp on a service-specific cell.

17 Claims, 9 Drawing Sheets

Related U.S. Application Data

(60) Provisional application No. 62/213,028, filed on Sep. 1, 2015.

(51) Int. Cl.

| | | |
|---|---|---|
| *H04W 36/22* | (2009.01) | |
| *H04W 76/27* | (2018.01) | |
| *H04W 48/16* | (2009.01) | |
| *H04W 48/18* | (2009.01) | |
| *H04W 48/20* | (2009.01) | |
| *H04W 36/30* | (2009.01) | |

(52) U.S. Cl.
CPC ........... *H04W 48/18* (2013.01); *H04W 48/20* (2013.01); *H04W 72/10* (2013.01); *H04W 76/27* (2018.02); *H04W 36/30* (2013.01)

(56) References Cited

U.S. PATENT DOCUMENTS

| | | |
|---|---|---|
| 2006/0128394 A1 | 6/2006 | Turina et al. |
| 2008/0045262 A1 | 2/2008 | Phan et al. |
| 2010/0061337 A1 | 3/2010 | Hallenstaal et al. |
| 2010/0085948 A1 | 4/2010 | Yu et al. |
| 2010/0197304 A1 | 8/2010 | Sawhney et al. |
| 2012/0275371 A1 | 11/2012 | Somasundaram et al. |
| 2013/0078989 A1 | 3/2013 | Kubota et al. |
| 2013/0343319 A1 | 12/2013 | Quan et al. |
| 2014/0113633 A1 | 4/2014 | Lee et al. |
| 2014/0113640 A1 | 4/2014 | Sachs et al. |
| 2014/0160923 A1 | 6/2014 | Joy et al. |
| 2014/0161020 A1 | 6/2014 | Jung et al. |
| 2014/0269566 A1 | 9/2014 | Wang et al. |
| 2014/0314046 A1 | 10/2014 | Jung et al. |
| 2015/0011216 A1 | 1/2015 | Jung et al. |
| 2015/0256995 A1* | 9/2015 | Rune ..................... H04W 8/186 455/418 |
| 2015/0312805 A1* | 10/2015 | Cui .................. H04W 36/0083 370/331 |
| 2015/0327133 A1 | 11/2015 | Yiu et al. |
| 2016/0037437 A1* | 2/2016 | Panchal ................ H04W 24/02 455/434 |
| 2016/0219475 A1 | 7/2016 | Kim |
| 2016/0234759 A1* | 8/2016 | Kubota ................. H04W 48/12 |
| 2017/0064691 A1 | 3/2017 | Kubota et al. |

FOREIGN PATENT DOCUMENTS

| | | |
|---|---|---|
| CN | 102340795 A | 2/2012 |
| EP | 3079411 A1 | 10/2016 |
| JP | 2008543153 A | 11/2008 |
| JP | 2009529830 A | 8/2009 |
| JP | 2016539564 A | 12/2016 |
| WO | 2006126137 A2 | 11/2006 |
| WO | 2007103496 A1 | 9/2007 |
| WO | 2011100707 | 8/2011 |
| WO | 2015002466 A2 | 1/2015 |
| WO | 2015065010 A1 | 5/2015 |
| WO | 2015065053 A1 | 5/2015 |
| WO | 2015084046 A1 | 6/2015 |

OTHER PUBLICATIONS

European Search Report—EP19151670—Search Authority—Munich—dated Apr. 18, 2019.
International Search Report and Written Opinion—PCT/US2016/045795—ISA/EPO—dated Jan. 11, 2017.
Partial International Search Report—PCT/US2016/045795—ISA/EPO—dated Oct. 10, 2016.
Taiwan Search Report—TW105126307—TIPO—dated May 18, 2020.

\* cited by examiner

SERVICE-BASED CELL SELECTION AND RESELECTION

CROSS REFERENCE TO RELATED APPLICATIONS

The present application is a Divisional Application of U.S. Non-Provisional application Ser. No. 15/017,476 filed Feb. 5, 2016, which claims priority to and the benefit of the U.S. Provisional Patent Application No. 62/213,028, filed Sep. 1, 2015, each of which is hereby incorporated by reference in its entirety.

TECHNICAL FIELD

Aspects of the present disclosure relate generally to wireless communication systems, and more particularly, to cell selection among available cells based on specific service availability. Enabling and providing techniques to allow a UE to select and reselect a serving cell based the availability of a cell to support a particular service can aid in ensuring that appropriate network connections are made and sustained as a way of bringing about efficient use of power resources and network resources, and improving overall user experience in a variety of use cases and deployment scenarios.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A base station may transmit data and control information on a downlink to a UE and/or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

In current mobile communication systems, a UE may select or reselect a serving cell based on the radio conditions and public land mobile network (PLMN) information of an associated base station. However, for new and developing services (e.g., industrial automation, self-driving cars, etc.) that require ultra-low latency (e.g., ~1 ms RTT or less) and highly reliable communication connections, the use of radio conditions and PLMN information may not be sufficient to ensure that the latency and reliability requirements necessary for proper implementation of the service are met.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication is provided that includes determining, by a user equipment (UE), one or more operating parameters of a cell needed to support a service of the UE. The method also includes receiving, at the UE, a communication from a first wireless communication device, the communication including at least one service indicator for a first cell. The method also includes determining, by the UE, whether to select the first cell for camping based at least in part on the at least one service indicator for the first cell and the one or more operating parameters.

In an additional aspect of the disclosure, a method for wireless communication is provided that includes setting, at a first wireless communication device, a value for at least one service indicator for a first cell. The method also includes transmitting, from the first wireless communication device to a user equipment (UE), a communication that includes the at least one service indicator for the first cell such that the UE can determine whether to select the first cell for camping based at least in part on whether the first cell satisfies one or more operating parameters needed to support a service of the UE based on the at least one service indicator.

In an additional aspect of the disclosure, a method for wireless communication is provided that includes identifying, by a user equipment (UE), one or more services of the UE. The method also includes selecting, by the UE, a service specific cell selection procedure or a default cell selection procedure based on the identified one or more services. The method also includes executing, by the UE, the selected cell selection procedure to identify and select a cell to camp on.

In an additional aspect of the disclosure, an apparatus is provided that includes a transceiver configured to receive a communication from a wireless communication device, the communication including at least one service indicator for a first cell. The apparatus also includes a processor configured to determine one or more operating parameters of a cell needed to support a service of the apparatus, and determine whether to select the first cell for camping based at least in part on the at least one service indicator for the first cell and the one or more operating parameters.

In an additional aspect of the disclosure, an apparatus is provided that includes a processor configured to set a value for at least one service indicator for a first cell. The apparatus also includes a transceiver configured to transmit, to a user equipment (UE), a communication that includes the at least one service indicator for the first cell such that the UE can determine whether to select the first cell for camping based at least in part on whether the first cell satisfies one or more operating parameters needed to support a service of the UE based on the at least one service indicator.

In an additional aspect of the disclosure, a computer readable medium having program code recorded thereon is provided, the program code including code for causing a user equipment (UE) to determine one or more operating parameters of a cell needed to support a service of the UE. The program code also includes code for causing the UE to receive a communication from a first wireless communication device, the communication including at least one service indicator for a first cell. The program code also includes code for causing the UE to determine whether to select the first cell for camping based at least in part on the at least one service indicator for the first cell and the one or more operating parameters.

In an additional aspect of the disclosure, a computer readable medium having program code recorded thereon is provided, the program code including code for causing a first wireless communication device to set a value for at least one service indicator for a first cell. The program code also includes code for causing the first wireless communication device to transmit, to a user equipment (UE), a communication that includes the at least one service indicator for the first cell such that the UE can determine whether to select the first cell for camping based at least in part on whether the first cell satisfies one or more operating parameters needed to support a service of the UE based on the at least one service indicator.

In an additional aspect of the disclosure, an apparatus is provided that includes means for determining, by the apparatus, one or more operating parameters of a cell needed to support a service of the apparatus. The apparatus also includes means for receiving, at the apparatus, a communication from a first wireless communication device, the communication including at least one service indicator for a first cell. The apparatus also includes means for determining, by the apparatus, whether to select the first cell for camping based at least in part on the at least one service indicator for the first cell and the one or more operating parameters.

In an additional aspect of the disclosure, a wireless communication device is provided that includes means for setting, at the apparatus, a value for at least one service indicator for a first cell. The apparatus also includes means for transmitting, from the apparatus to a user equipment (UE), a communication that includes the at least one service indicator for the first cell such that the UE can determine whether to select the first cell for camping based at least in part on whether the first cell satisfies one or more operating parameters needed to support a service of the UE based on the at least one service indicator.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
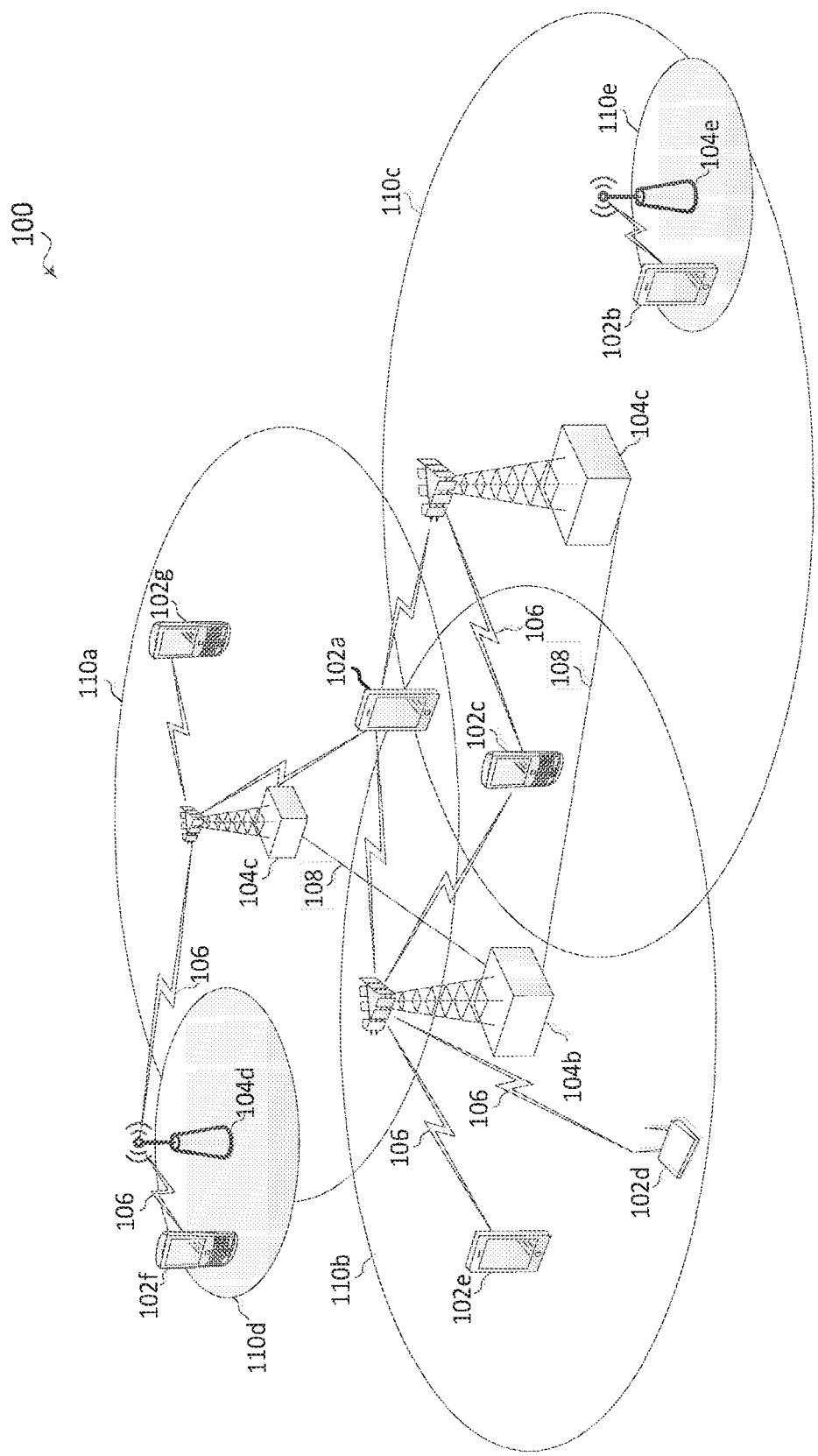
FIG. 1 illustrates a wireless communication network in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA, LTE networks, GSM networks, and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5th Generation (5G)) network. Embodiments of this disclosure are directed to any type of modulation scheme that may be used on any one or more of the above-recited networks and/or those yet to be developed.

A new carrier type based on LTE/LTE-A including in unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Embodiments of this disclosure can be implemented in any type of shared spectrum having multiple tiers of users, including both licensed and unlicensed spectrums.

Embodiments of the present disclosure introduce systems and techniques for selecting and/or reselecting service-specific cells within a wireless communication environment that takes into consideration additional information about service availability on top of radio conditions and PLMN information. In an embodiment, a base station takes note of what specific services the base station is able to serve, for example industrial automation, a mission critical service, conversational service, streaming service, interactive service, logistic/route guidance, telematics, finance/costs, entertainment, connectivity parameters, appropriate BW values, power constraints, and background class services to name just a few specific services. The base station may include this service availability information with other information typically sent to UEs, for example with system information.

When a UE seeks to camp on a cell of a base station, the UE may receive system information from the base station that includes service availability information. The UE may receive system information from multiple candidate cells when determining which cell to camp on. The UE may maintain locally a set of requirements for one or more services that the UE either is going to utilize or predicts it will utilize. The UE may filter the system information from the candidate cells to rule out those cells that do not support the one or more services for the UE. The UE may take one or more measurements, e.g. of radio conditions for the different cells, and together with comparison of the system information (service availability information) against the set of requirements and the radio conditions, determine what cell may best fit the needs for the one or more services. The UE may then camp on that cell. In an embodiment, the UE may store the system information and other measurement information for all or some subset of the candidate cells for future cell selection/reselection use as necessary. In this manner, the UE may give priority to selection of cells that have specific service availability.

In embodiments, the availability of one or more services at a base station may change over time. When a change to one or more of the services occurs (e.g., due to congestion or some other factor), the base station may detect the change and update the service availability information in the system information. The base station may send out a notification that indicates a change to the information has occurred to any UEs camped on the cell of the base station, and in response to a request from the UEs send out the changed system information. A UE camped on the cell of the base station may go through a cell reselection process with the updated system information, and if necessary select a different cell that better fits the needs of the one or more services for the UE. If the service is not available at any of the base stations, the UE may turn to selecting a cell on which to camp that may, for example, support normal service (e.g., a suitable cell). Whenever a new network (such as PLMN) is selected, or a new service selected, or a service is disabled or enabled, the UE may again perform cell selection/reselection in an attempt to again camp on a service-specific cell.

FIG. 1 illustrates a wireless communication network 100 in accordance with various aspects of the present disclosure. The wireless communication network 100 may include a number of UEs 102, as well as a number of base stations 104. The base stations 104 may include an evolved Node B (eNodeB). A base station 104 may also be referred to as a base transceiver station, a node B, or an access point. A base station 104 may be a station that communicates with the UEs 102 and may also be referred to as a base station, a node B, an eNodeB (or eNB), an access point, and the like.

The base stations 104 communicate with the UEs 102 as indicated by communication signals 106. A UE 102 may communicate with the base station 104 via an uplink and a downlink. The downlink (or forward link) refers to the communication link from the base station 104 to the UE 102. The uplink (or reverse link) refers to the communication link from the UE 102 to the base station 104. The base stations 104 may also communicate with one another, directly or indirectly, over wired and/or wireless connections, as indicated by communication signals 108.

UEs 102 may be dispersed throughout the wireless network 100, as shown, and each UE 102 may be stationary or mobile. The UE 102 may also be referred to as a terminal, a mobile station, a subscriber unit, etc. The UE 102 may be a cellular phone, a smartphone, a personal digital assistant, a wireless modem, a laptop computer, a tablet computer, etc. The wireless communication network 100 is one example of a network to which various aspects of the disclosure apply.

Each base station 104 may provide communication coverage for a particular geographic area. In 3GPP, the term "cell" can refer to this particular geographic coverage area of a base station and/or a base station subsystem serving the coverage area, depending on the context in which the term is used. In this regard, a base station 104 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a pico cell may be referred to as a pico base station. And, a base station for a femto cell may be referred to as a femto base station or a home base station. In the example shown in FIG. 1, the base stations 104a, 104b and 104c are examples of macro base station for the coverage areas 110a, 110b and 110c, respectively. The base stations 104d and 104e are examples of pico and/or femto base stations for the coverage areas 110d and 110e, respectively. A base station 104 may support one or multiple (e.g., two, three, four, and the like) cells.

The cells, or geographic coverage areas, which the base stations 104 provide may offer different levels of service from each other, either as a result of an express decision or because of some environmental factor(s) affecting the base stations 104. For example, a cell provided by a base station 104 may be classified as an acceptable cell, where only limited services are available (e.g., emergency calls, ETWS (Earthquake Tsunami Warning System) and/or CMAS (Commercial Mobile Alert System)). As another example, a cell provided by a base station 104 may be classified as a suitable cell, where normal services are available (e.g., the cell is for public use for regular calls, data transmission/reception, etc.). As another example, a cell provided by a base station 104 may be classified as a barred cell, where no service is available at all. As another example, a cell provided by a base station 104 may be classified as a reserved cell, where operator service only is available (e.g., service for operators only). According to embodiments of the present disclosure, a cell provided by a base station 104 may also be a service specific cell, which refers to a cell where a specific service is available to UEs 102. Some examples of specific services may include industrial automation, a mission critical service, conversational service, streaming service, interactive service, and background class services.

The wireless network 100 may also include relay stations. A relay station is a station that receives a transmission of data and/or other information from an upstream station (e.g., a base station, a UE, or the like) and sends a transmission of the data and/or other information to a downstream station (e.g., another UE, another base station, or the like). A relay station may also be a UE that relays transmissions for other UEs. A relay station may also be referred to as a relay base station, a relay UE, a relay, and the like.

The wireless network 100 may support synchronous or asynchronous operation. For synchronous operation, the base stations 104 may have similar frame timing, and transmissions from different base stations 104 may be approximately aligned in time. For asynchronous operation, the base stations 104 may have different frame timing, and transmissions from different base stations 104 may not be aligned in time.

In some implementations, the wireless network 100 utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

According to embodiments of the present disclosure, a UE 102 may have one or more services that it seeks or is required to use (e.g., such as the examples listed above including industrial automation, mission critical services, conversational services, streaming services, interactive services, and/or background class services to name just a few examples). In selecting a cell on which to camp (for example while in IDLE mode), the UE 102 may give priority to those cells that support a specific service or set of services, such as one or more services that the UE 102 is using, or predicts or knows it will be required to use when switching to connected mode. To this end, base stations 104 may include in their system information one or more service availability indicators that the UE 102 may check when receiving the system information. The UE 102 may compare information from, or derived from, the service availability indicators of the various cells from which it currently receives reception, and select a cell which best meets the requirements of a specific service or set of services.

In the example illustration of FIG. 1, UE 102*a* is illustrated as being within the coverage areas 110*a*, 110*b*, and 110*c* of base stations 104*a*, 104*b*, and 104*c*, respectively. In other words, UE 102*a* is within the cells of these respective base stations 104. The UE 102*a*, when attempting to initiate cell access (or cell reselection, as the case may be), may obtain service availability information (including the service availability indicator) from the base stations 104*a*, 104*b*, and 104*c*. This may be obtained either as part of the system information from the base stations 104, or alternatively upon express request by the UE 102*a*. The service availability information may also include various parameters of the corresponding cell/coverage area that the UE 102*a* may use in comparison against the range of values necessary to support one or more specific services for the UE 102*a*. Once the UE 102*a* has the information, the UE 102*a* may compare the service availability information to the service or services the UE 102*a* may be required to perform in connected mode, and select the base station 104 whose service availability best corresponds to the required services.

While camped on the cell of the corresponding base station 104, if the base station 104 detects that circumstances have changed (e.g., the base station 104 is no longer able to support the specific service(s) anymore, such as due to increased congestion, also referred to as load), the base station 104 may send a message to the UE 102*a* indicating that a change has occurred, at which time the UE 102*a* may request details of the change so the UE 102*a* may determine whether the UE 102*a* should search for another cell on which to camp while in IDLE mode. In an embodiment, the UE 102*a* may store service availability information for the cell selected, as well as others considered, for future cell selection/reselection needs.

Figure 2:
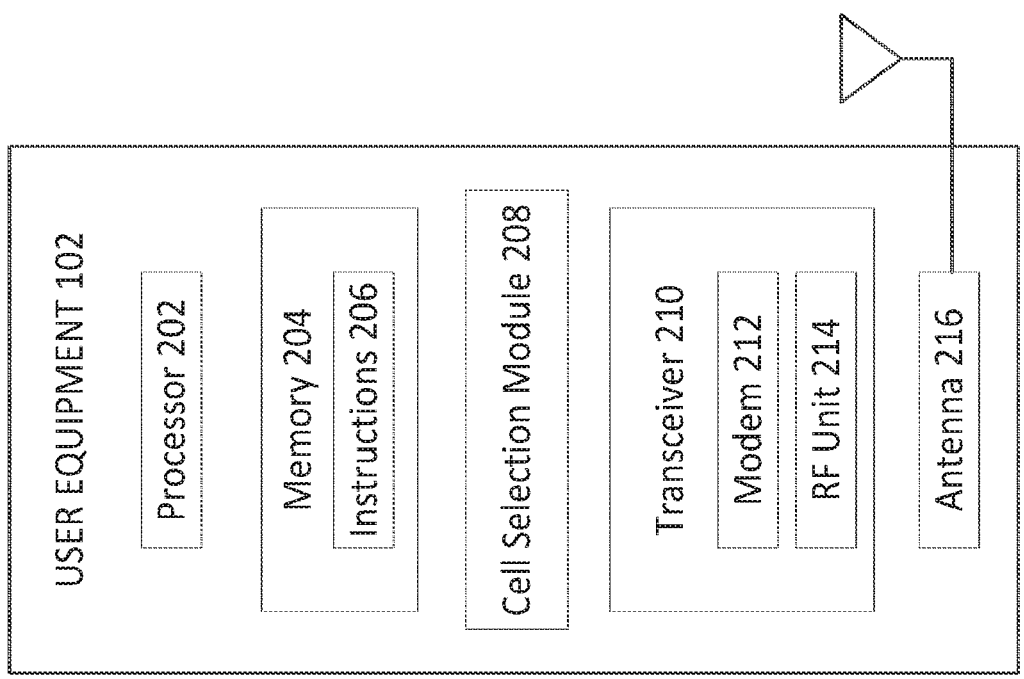
FIG. 2 is a block diagram of an exemplary wireless communication device, such as a user equipment, according to embodiments of the present disclosure.

FIG. 2 is a block diagram of an exemplary wireless communication device 200 according to embodiments of the present disclosure. The wireless communication device 200 may be a UE 102 as discussed above. As shown, the UE 102 may include a processor 202, a memory 204, a shared spectrum coordination module 208, a transceiver 210 (including a modem 212 and RF unit 214), and an antenna 216. These elements may be in direct or indirect communication with each other, for example via one or more buses.

The processor 202 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to UEs 102 introduced above with respect to FIG. 1 and discussed in more detail below. In particular, the processor 202 may be utilized in combination with the other components of the UE 102, including shared spectrum coordination module 208, to perform the various functions associated with the master and/or slave devices of second and/or third tier networks as described in greater detail below. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the UEs 102 in connection with embodiments of the present disclosure. Instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The cell selection module 208 may be used for various aspects of the present disclosure. For example, the cell selection module 208 may be involved in the selection and/or reselection of service cells and in directing the UE 102 to camp on a selected service cell. This may occur where the UE 102 seeks to select a new network, such as a new PLMN, a new service is selected, or the status of the service changes (e.g., disabled or enabled). The cell selection module 208 compares service availability information from one or more base stations 104 in whose coverage the UE 102 is in range against service requirements of known or predicted services that the UE 102 will have to use when in connected mode. The cell selection module 208 may determine what service requirements are needed in response to what service (or services) is currently active or activation of the corresponding service by an upper layer of the UE 102 or a user of the UE 102, for example. In an embodiment, the cell selection module 208 may configure one or more operating parameters at the UE 102, whether for a specific service, or in anticipation of a specific service, such as is obtained from a server such as an Access Network Discovery and Selection Function (ANDSF) in the network, e.g., the UE 102 requests policies and network selection information from the ANDSF and receives requested information in return, such as pertaining to other access networks available (and which may provide specific services).

The cell selection module 208 may direct the UE 102 to undertake different selection procedures depending upon whether the cell selection module 208 has any information on surrounding cells or not. For example, if the UE 102 is in a new area and attempting to select a cell for the first time in that area (or of any area), then the cell selection module 208 may proceed with cell selection with no prior knowledge of which RF channels are carriers which support the UE 102. Thus, the cell selection module 208 may cause the UE 102 (e.g., the transceiver 210) to scan all RF channels in the frequency bands of the radio access technologies (RATs) in the vicinity of the UE 102 (as limited by the physical capabilities of the transceiver 210). As the UE 102 scans the different carrier frequencies of the different bands, the cell selection module 208 may direct the UE 102 to search only for the cell with the strongest measurement results (e.g., highest reference signal received power (RSRP), reference signal received quality (RSRQ), signal to noise (SNR) ratio, and/or signal to interference ratio).

As another example, if the UE 102 is in an area where the UE 102 has previously selected service-specific cells (either selection or reselection), the UE 102 may access stored information for one or more cells in the area (e.g., system information stored in memory 204) regarding carrier frequencies, cell parameters, other measurement information, and previously received service information about the cells (e.g., either for cells considered for selection, cells on which the UE 102 has previously camped, or both). In an embodiment, the cell selection module 208 may analyze service availability information of the cell currently serving the UE 102 (where applicable) and, if the service availability information (and, in some embodiments, the radio conditions of the cell currently serving the UE 102) meets the needs of the known or predicted services, abstain from attempting to acquire system information from other (non-serving) cells. In another embodiment, the cell selection module 208 may access stored information for multiple cells in the area. Either way, the cell selection module 208 may supplement this stored information with new measurements of some subset (or all) of the cells within range and detectable by the transceiver 210. For example, where the cell selection module 208 determines that the information stored for one or more cells is older than a preset time frame, the cell selection module 208 may direct the UE 102 to supplement with "fresh" measurements/requested information.

The cell selection module 208 may direct the UE 102 to request system information from the accessible cells within range of the UE 102. Alternatively, the base stations 104 of the cells within range may transmit system information without on their own initiative when the UE 102 comes within range. As another alternative, base stations 104 may broadcast their system information regardless of the location of any UEs within coverage range. The system information may include different information, including service availability information of the cell of the base station 104 transmitting the system information. The information may be included in an information block, such as a Master Information Block (MIB), System Information Block (SIB) 1, or SIB 2 for LTE/5G systems or Master System Information for 5G UE-centric MAC network systems. In an alternative embodiment, the information may be signaled to the UE 102 via a Quality of Service Class Identifier (QCI). In an embodiment, service availability (e.g., in system information) may be indicated by a flag (e.g., the flag set indicates that a service is available, where there may be different flags for different, expected service types). In another embodiment, service availability may be indicated by a listing of services actually supported by the cell, or supportable by the cell (e.g., a string or identifier). In addition, or in an alternative embodiment, the availability may be indicated by a listing of parameters of the cell (e.g., a range of reliability supported by the cell, max throughput allowed by the cell, etc.). In an alternative embodiment, the information may be received via unicast messaging such as radio resource control (RRC) communications or non-access stratum (NAS) messaging, to name some examples.

In addition to the system information, including service availability, of the cells that the cell selection module 208 acquires, the UE 102 may also measure the radio conditions of the cells as mentioned above for consideration together with the service availability information received from the base stations 104 of the cells under consideration. In an additional or alternative embodiment, the UE 102 that supports a specific service may have received (previously or at the time) information including location identifiers such as a PLMN, tracking area, zone, and/or cell (or multiple of any one or more of these) where the specific service is also supported and available. This may be received also via system information or via unicast messaging such as RRC communications or NAS messaging.

In an embodiment, the cell selection module 208 may analyze the system information provided from each of the cells, e.g. even before measuring the radio conditions for radio quality evaluation. This may occur after determining that the candidate cells are strong enough to serve the UE 102, e.g., by evaluating the cell selection criterion S (e.g., confirming that a value, such as signal strength (or signal quality) in dB, is greater than a threshold value such as 0). For example, the cell selection module 208, e.g. by way of the processor 202, may compare the services identified by the various candidate cells against the service or services in use or predicted to be in use by the UE 102. In analyzing the service availability information provided by the different candidate cells, the cell selection module 208 may check whether the candidate cells satisfy one or more of different operating parameters, including carrier aggregation, dual connectivity, radio access technology, operating frequency, asynchronous data transfer, latency, and/or quality of service classes to name just a few examples.

Where there are multiple services that the UE 102 takes into consideration when selecting a cell on which to camp, the cell selection module 208 may assign a weight to each service at issue (or consider a weight assigned elsewhere) and determine which cell has the highest fit with the desired operating parameters of the services and make its selection based on this fit. For example, the cell selection module 308 may select the cell with the highest total score among the different services. In another embodiment, no weight may be involved but rather the cell that best fits any one service among the services may be selected.

The cell selection module 208 may compare these parameters against the information obtained from the system information. Based on the results of this comparison, the cell selection module 208 may filter out candidate cells that do not match the necessary services for the UE 102. In other words, the cell selection module 208 may direct the UE 102 to ignore any cells that may not support the one or more services for the UE 102, whether the cells are at the same or different frequency bands. Thus, the UE 102 may avoid measuring conditions of certain cells where those cells do not support the specific service(s), thereby avoiding unnecessary overhead and energy consumption.

After filtering out candidate cells that do not support the specific service(s) required for the UE 102 (e.g., the candidate cells do not satisfy listed operating parameters for the service(s)), the cell selection module 208 may then either direct the UE 102 to collect one or more radio condition measurements or assess measurements previously taken. The filtering may serve to remove cells from selection where the UE 102 is unable to obtain a necessary (or predicted) service. The cell selection module 208 may then compare the measurement results, e.g. radio quality (such as signal strength or some other parameter), of the different candidate cells and select the candidate cell with the highest value from among the options. The cell selection module 208 selects the cell, which in this situation both meets the service requirements and has the best radio quality from among the filtered candidates, and directs the UE 102 to camp on the selected cell while in IDLE mode.

The cell selection module 208 may guide the UE 102 through the above process at an initial cell selection, when there is some change at a selected cell that the corresponding base station 104 informs the UE 102 about (e.g., via a change indication message and/or system information message), when the UE 102 selects a new network (e.g., PLMN), when the UE 102 changes what service it is using or predicts it will use, and/or a service status changes (e.g., when the service is disabled or enabled at the UE 102 or at a host/web server corresponding to the service at another end of the network). In an embodiment, the cell selection module 208 waits to perform the cell selection procedure until a service is activated at the UE 102. In an alternative embodiment, the cell selection module 208 engages in the cell selection procedure regardless of whether a specific service has been activated or not, e.g. based on what service or services are predicted to be used or on some balance of requirements among the different services available for the UE 102 at a given point in time.

The cell selection module 208 may also direct the UE 102 to store information obtained in and for the cell selection procedure, e.g. in memory 204. This may include, for example, system information (including service availability information where provided) of the different candidate cells considered and/or measurement information obtained during that consideration, which the UE 102 may use in future efforts to decide what cell to camp on according to embodiments of the present disclosure.

In situations where the cell selection module 208 cannot identify a cell that meets criteria for one or more services at the UE 102, the cell selection module 208 may then direct the UE 102 to search for any suitable cell for normal operation. The resulting cell may not meet the express parameters of a specific service, but may nonetheless provide a connection that may or may not meet the particular needs of a specific service during active transmission/reception while the UE 102 is in a connected mode.

As shown, the transceiver 210 may include the modem subsystem 212 and the radio frequency (RF) unit 214. The transceiver 210 can be configured to communicate bi-directionally with other devices, such as base stations 104. The modem subsystem 212 may be configured to modulate and/or encode the data from the cell selection module 208 and other aspects of the UE 102, such as processor 202 and/or memory 204, according to a modulation and coding scheme (MCS), e.g., a low-density parity check (LDPC) coding scheme, a turbo coding scheme, a convolutional coding scheme, etc. The RF unit 214 may be configured to process (e.g., perform analog to digital conversion or digital to analog conversion, etc.) modulated/encoded data from the modem subsystem 212 (on outbound transmissions) or of transmissions originating from another source such as a UE 102 or a base station 104. Although shown as integrated together in transceiver 210, the modem subsystem 212 and the RF unit 214 may be separate devices that are coupled together at the UE 102 to enable the UE 102 to communicate with other devices.

The RF unit 214 may provide the modulated and/or processed data, e.g. data packets (or, more generally, data messages that may contain one or more data packets and other information), to the antenna 216 for transmission to one or more other devices. This may include, for example, transmission of connection information, the receipt of system information, and measurement of cell parameters according to embodiments of the present disclosure. The antenna 216 may further receive data messages transmitted from other devices and provide the received data messages for processing and/or demodulation at the transceiver 210. Although FIG. 2 illustrates antenna 216 as a single antenna, antenna 216 may include multiple antennas of similar or different designs in order to sustain multiple transmission links.

Figure 3:
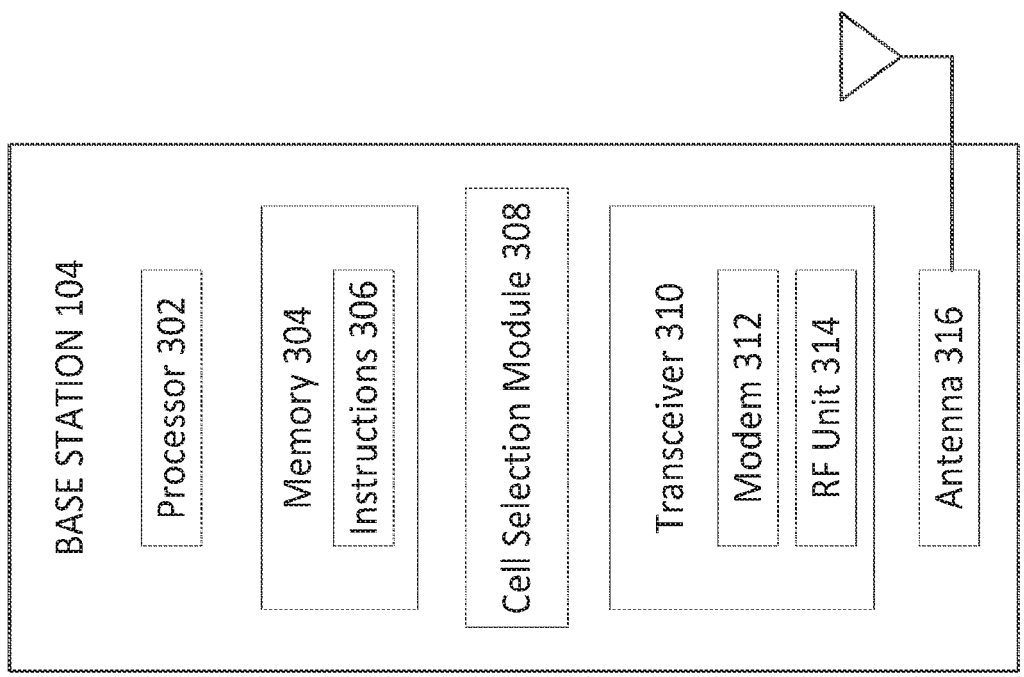
FIG. 3 is a block diagram of an exemplary wireless communication device, such as a base station, according to embodiments of the present disclosure.

FIG. 3 illustrates a block diagram of an exemplary base station 104 according to the present disclosure. The base station 104 may include a processor 302, a memory 304, a cell selection module 308, a transceiver 310 (including a modem 312 and RF unit 314), and an antenna 316. These elements may be in direct or indirect communication with each other, for example via one or more buses.

The processor 302 may have various features as a specific-type processor. For example, these may include a CPU, a DSP, an ASIC, a controller, a FPGA device, another hardware device, a firmware device, or any combination thereof configured to perform the operations described herein with reference to the base stations 104 introduced in FIG. 1 above. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 304 may include a non-transitory computer-readable medium. The memory 304 may store instructions 306. The instructions 306 may include instructions that, when executed by the processor 302, cause the processor 302 to perform operations described herein with reference to a base station 104 in connection with embodiments of the present disclosure. Instructions 306 may also be referred to as code, which may be interpreted broadly to include any type of computer-readable statement(s) as discussed above with respect to FIG. 2.

The cell selection module 308 may be used for various aspects of the present disclosure. For example, the cell selection module 308 may be involved in communicating with a UE 102 to inform the UE 102 of the service characteristics of the one or more cells provided by the base station 104, that the UE 102 may then use in determining what cell to select to camp on. The cell selection module 308 may access system information about the base station 104 (and its corresponding coverage area 110) and instruct the transceiver 310 of the base station 104 to transmit the accessed system information. The UE 102 may then use this system information as described above to determine whether to select the base station 104 on which to camp.

According to embodiments of the present disclosure, the cell selection module 308 can cause the base station 104 to store service availability information with the system information, and include the service availability information with the system information in transmissions to requesting UEs 102. For example, the cell selection module 308 may set a flag (e.g., the flag indicating that a service is available, where there may be different flags for different service types). In an embodiment, the cell selection module 308 may determine whether to set the flag to indicate a particular service that is supported by the base station 104 as available depending on a condition at the base station 104, such as current level of congestion (load). Thus, though the base station 104 may otherwise be configured to support a particular service, e.g. industrial automation, current conditions at the base station 104 may cause the cell selection module 308 to identify in the service availability information that the service is not available—e.g., by setting a flag to FALSE (where the service is available when the flag is set to TRUE).

In another embodiment, service availability may be indicated by a listing of services actually supported by the cell, or supportable by the cell (e.g., a string or identifier). In addition, or in an alternative embodiment, the availability may be indicated by a listing of parameters of the cell (e.g., carrier aggregation, latency, jitter, load, cell capability such as a range of reliability supported by the cell, max throughput allowed by the cell, etc.). Further, the service availability may be indicated by modes that the PHY can use (such as asynchronous small data transfer, high reliability, etc.). In alternative embodiments, the service availability information may be signaled to the UE 102 via QCI.

As conditions at the base station 104 may change for any cell at the base station 104, the cell selection module 308 may occasionally update the service availability information locally and initiate a message for the base station 104 to send to UEs 102 currently camped on the changed cell that something has changed. For example, conditions at the base statin 104 may change such that a cell previously identified as available for a particular service (e.g., industrial automation) becomes congested (loaded) so that it cannot adequately meet the demands of the particular service. The cell selection module 308 may change the service availability information locally, store it, and trigger a message to the UE 102 that indicates to the UE 102 that a change has occurred with the cell the UE 102 is camped on. The base station 104 then provides the system information (with updated information) to the UE 102 in response to the notification of change. Thus, the base station 104 may dynamically respond to changes in load conditions for the cell.

As shown, the transceiver 310 may include the modem subsystem 312 and the radio frequency (RF) unit 314. The transceiver 310 can be configured to communicate bi-directionally with other devices, such as UE 102 and/or another core network element. The modem subsystem 312 may be configured to modulate and/or encode data according to a MCS, e.g., a LDPC coding scheme, a turbo coding scheme, a convolutional coding scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 102. Although shown as integrated together in transceiver 310, the modem subsystem 312 and the RF unit 314 may be separate devices that are coupled together at the base station 104 to enable the base station 104 to communicate with other devices.

The RF unit 314 may provide the modulated and/or processed data, e.g. data packets (or, more generally, data messages that may contain one or more data packets and other information), to the antenna 316 for transmission to one or more other devices. This may include, for example, transmission of information to complete attachment to a network and communication with a camped UE 102 according to embodiments of the present disclosure. The antenna 316 may further receive data messages transmitted from other devices and provide the received data messages for processing and/or demodulation at the transceiver 310. Although FIG. 3 illustrates antenna 316 as a single antenna, antenna 316 may include multiple antennas of similar or different designs in order to sustain multiple transmission links.

Figure 4:
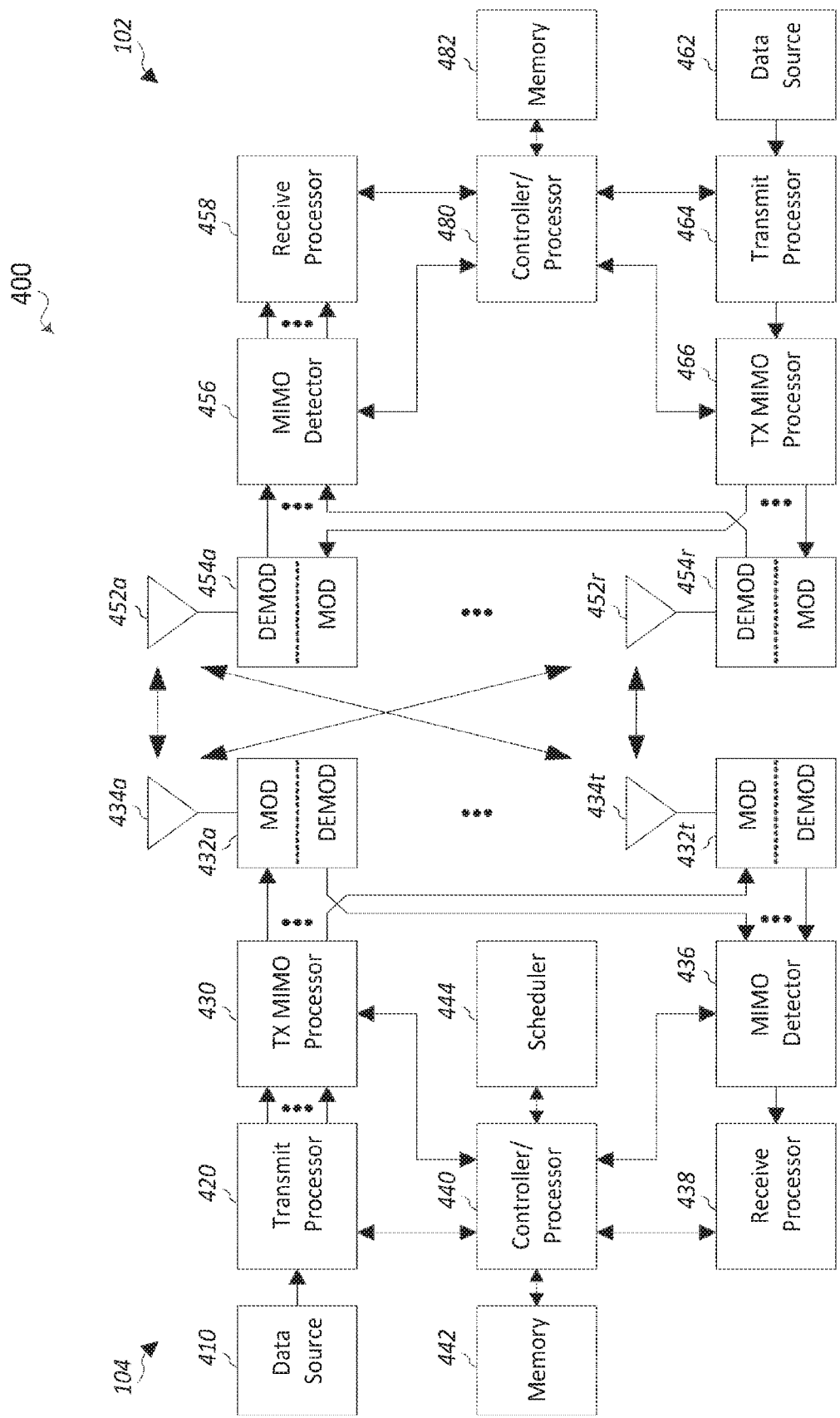
FIG. 4 is a block diagram illustrating an exemplary transmitter and receiver system, such as a base station and a user equipment, in accordance with various aspects of the present disclosure.

FIG. 4 shows a block diagram illustrating communication between two wireless communication devices of a MIMO system 400 in accordance with the present disclosure. For sake of clarity in explanation, a base station 104 and a UE 102 are shown. However, it is understood that the following description is applicable to communication between any two wireless communication devices in accordance with the present disclosure. Further, the following discussion will focus on those aspects pertinent to the present disclosure; as will be recognized, the elements of FIG. 4 may be further used for other purposes.

At the base station 104, a transmit processor 420 may receive data from a data source 410 and control information from a controller/processor 440. The data rate, coding, and modulation for each data stream may be determined by instructions performed by processor 430. The transmit processor 420 may process (e.g., encode and symbol map) the data and control information to obtain data symbols and control symbols, respectively. This may include, for example, symbol mapping based on a particular modulation scheme (e.g., BPSK, QSPK, M-PSK, or M-QAM). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t.

Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via antennas 434a through 434t, respectively. Embodiments of the present disclosure include having only one antenna or having multiple antennas (at one or both of base station 104 and UE 102).

At the UE 102, antennas 452a through 452r may receive the downlink signals from the base station 104 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 102, and provide decoded control information to a controller/processor 480.

On the uplink, at the UE 102, a transmit processor 464 may receive and process data from a data source 462 and control information from the controller/processor 480. The data may include data transmitted as part of a service (e.g., to a base station 104 selected for a particular service) and the control information may include attach information, a request for updated system information, and/or connection setup or response information. The transmit processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 104. At the base station 104, the uplink signals from the UE 102 may be received by the antennas 434, processed by the demodulators 432, detected by a MIMO detector 436, if applicable, and further processed by a receive processor 438 to obtain decoded data and control information sent by the UE 102. The processor 438 may provide the decoded data to a data sink and the decoded control information to the controller/processor 440.

The controllers/processors 440 and 480 may direct the operation at the base station 104 and the UE 102, respectively. The controller/processor 440 and/or other processors and modules at the base station 104 may perform or direct the execution of various processes for the techniques described herein, including the identification of services available/supported by the base station 104 and signaling between the base station 104 and UE 102. The controllers/processor 480 and/or other processors and modules at the UE 102 may also perform or direct the execution of the various processes for the techniques described herein, including the identification of service availability information in signaling from the base station 104, comparison to service availability needs at the UE 102, and selection of a particular cell based on the comparison. In this regard, the memories 442 and 482 may store data and program codes for the base station 104 and the UE 102, respectively, to perform or direct the execution of these various processes. A scheduler 444 may schedule wireless communication devices for data transmission on the downlink and/or uplink.

Figure 5:
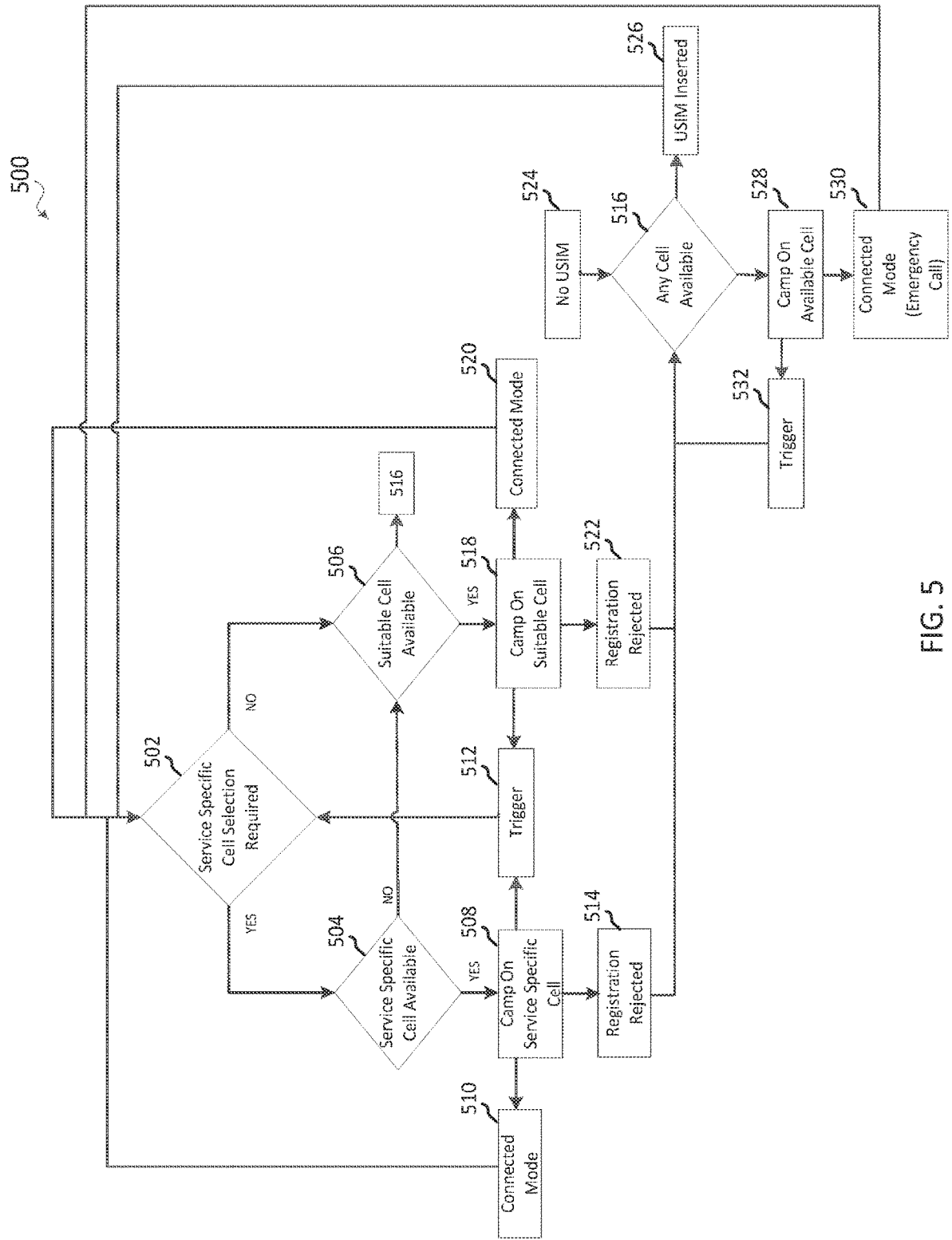
FIG. 5 is a flowchart illustrating an exemplary method for wireless communication cell selection in accordance with various aspects of the present disclosure.

FIG. 5 is a flowchart illustrating an exemplary method 500 for wireless communication cell selection in accordance with various aspects of the present disclosure. In particular, the method 500 illustrates the selection of cells for camping according to embodiments of the present disclosure. Method 500 may be implemented in the UE 102. It is understood that additional steps can be provided before, during, and after the steps of method 500, and that some of the steps described can be replaced or eliminated from the method 500.

At decision block 502, the UE 102 determines whether service-specific cell selection is required. This may occur, for example, where the UE is in IDLE mode (whether returning from connected mode state, from startup/reboot, etc.). The UE 102 returns to this decision block in situations where a new network (e.g., PLMN) is selected, where a new service is selected, and a service status changes (e.g., from disabled or enabled). When the UE 102 is not camped on a service-specific cell, the UE 102 may seek to reselect a service-specific cell (e.g., under direction of the NAS layer).

If the UE 102 determines that service-specific cell selection is required, then the method 500 proceeds to decision block 504. At decision block 504, the UE 102 determines whether a service-specific cell is available. This may include, for example, the procedures discussed above with respect to the cell selection module 208 of FIG. 2, including obtaining service availability information, comparing that information to service requirements at the UE 102, and selecting a cell to camp on.

If the UE 102 determines that a service-specific cell is available, the method 500 proceeds to block 508. At block 508, the UE 102 camps on the selected service-specific cell while in IDLE mode.

The method 500 proceeds from block 508 to block 510, where UE 102 leaves IDLE mode in a transition to connected mode. The UE 102 establishes a connection with the base station 104 corresponding to the selected cell on which the UE 102 is camping. The UE 102 maintains the connection for a duration of when data is transmitted and/or received according to a specific service that the UE 102 is using. Once the needs of the service have been met, e.g. all necessary has been transmitted and/or received, the method 500 proceeds back to decision block 502 and proceeds as described above and/or further below.

Returning to block 508, if the UE 102 receives a trigger, the method 500 proceeds to block 512. At block 512, a trigger causes the UE 102 to return to decision block 502 to seek to again connect to a service-specific cell. The trigger may result, for example, from the base station 104 of the cell on which the UE 102 is currently camped sending a system information change indication to the UE 102. This triggers the UE 102 to receive the changed system information and identify what has changed. This then takes the UE 102 to decision block 502.

Returning to block 508, if the UE 102 discovers that registration on the selected network is rejected (e.g., NAS indicates that registration on the selected network is rejected, such as according to access control including access class barring, service specific access control, and/or enhanced access barring), from block 514 the method 500 proceeds to decision block 516 as will be discussed in more detail below.

Returning to decision block 504, if the UE 102 instead determines that a service-specific cell is not available, the method 500 proceeds to decision block 506. Returning to decision block 502, if the UE 102 determines that service-specific cell selection is not required, then the method 500 also proceeds to decision block 506.

At decision block 506, the UE 102 determines whether there is a suitable cell available. A suitable cell is one where normal service is possible, but is not necessarily supportive of the particular requirements/parameters for a specific service for the UE 102.

If the UE 102 determines at decision block 506 that a suitable cell is available, the method 500 proceeds to block 518. At block 518, the UE 102 camps on the suitable cell while in IDLE mode. If the UE 102 receives a trigger, the method 500 proceeds to block 512 as described above.

If the UE 102 instead has data to send or receive while camped on the suitable cell at block 518, the method 500 proceeds to block 520. At block 520, UE 102 leaves IDLE mode in a transition to connected mode. The UE 102 establishes a connection with the base station 104 corresponding to the suitable cell on which the UE 102 is camping. The UE 102 maintains the connection for a duration of when data is transmitted and/or received. Once the data has been transmitted and/or received, the method 500 proceeds back to decision block 502 and proceeds as described above and/or further below.

If the UE 102, while at block 518, instead discovers that registration on the selected network is rejected (e.g., NAS indicates that registration on the selected network is rejected, such as according to access control including access class barring, service specific access control, and/or enhanced access barring), from block 522 the method 500 proceeds to decision block 516 as will be discussed in more detail below.

Returning to decision block 506, if the UE 102 instead determines that a suitable cell is not available, the method 500 proceeds to decision block 516.

At decision block 516, which can also be reached when the UE 102 does not have a USIM (block 524), the UE 102 determines whether any cell is available. Any cell may refer, for example, to acceptable cells where only limited service, such as emergency calls, is available.

Where the UE 102 reaches decision block 516 from block 524, where no USIM was in the UE 102, and a USIM is inserted into the UE 102, then the method 500 proceeds back to decision block 502 in an effort to locate a service-specific cell where possible.

If, at decision block 516, the UE 102 determines that any cell is available, the method 500 proceeds to block 528.

At block 528, the UE 102 camps on the available cell while in IDLE mode. If the UE 102 receives a trigger, the method 500 returns back to decision block 516 to perform a cell reselection process, which may also involve the UE 102 again determining whether a service-specific cell is available, in which case the method 500 instead returns to decision block 502 instead of decision block 516.

If, at block 528, the UE 102 instead is tasked with establishing an emergency call (which is what is supported in limited cells such as the selected available cell), the method 500 proceeds to block 530. The UE 102 establishes a connection with the base station 104 corresponding to the available cell on which the UE 102 is camping. The UE 102 maintains the connection for a duration of when the emergency call is maintained. Once the data has been transmitted and/or received, the method 500 proceeds back to decision block 502 and proceeds as described above.

In this manner, the UE 102 according to method 500 may repeatedly return to situations where the UE 102 may attempt to locate, select, and camp on a service-specific cell according to embodiments of the present disclosure.

Figure 6:
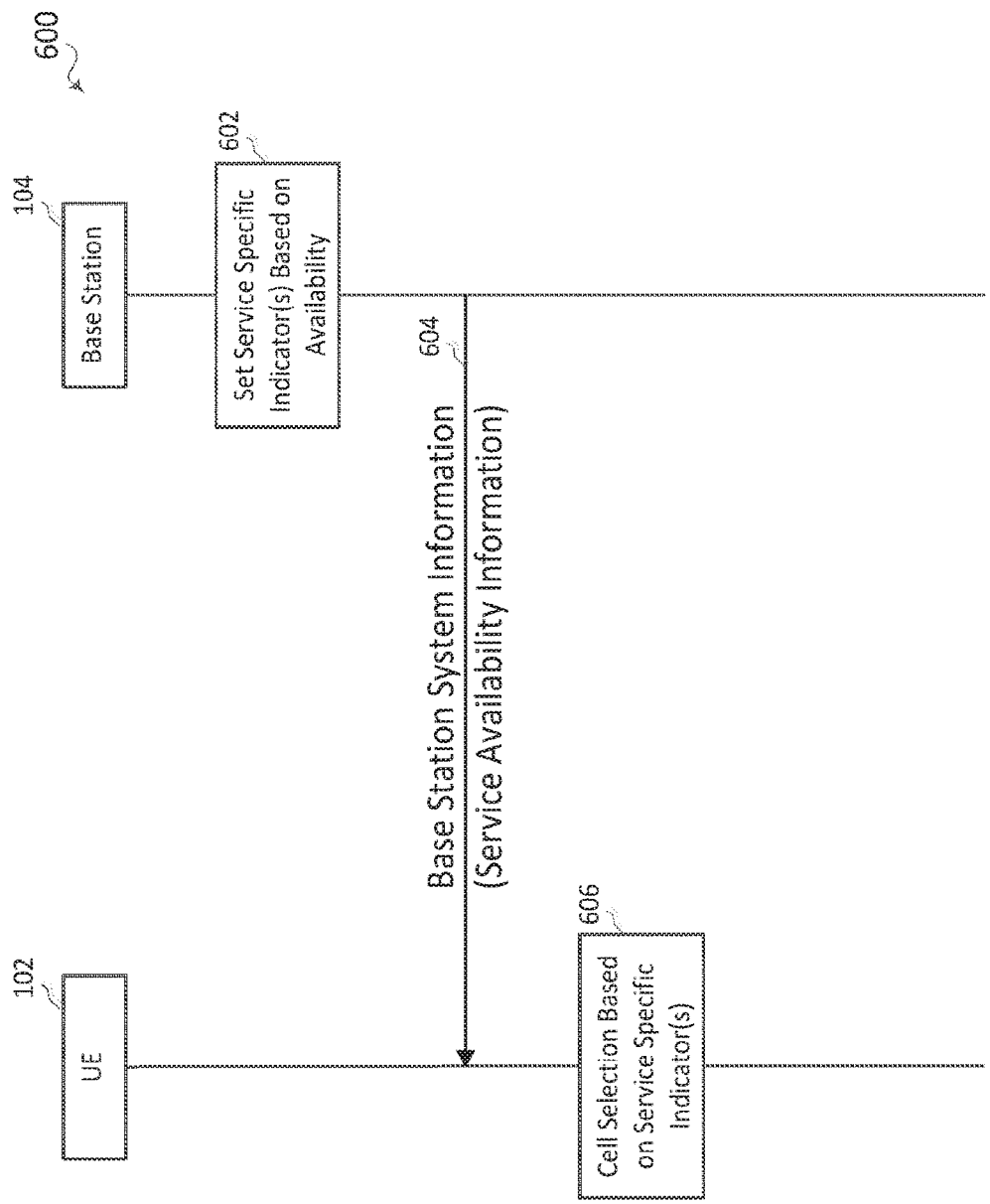
FIG. 6 is a diagram illustrating signaling between wireless communication devices, such as a base station and a user equipment, for wireless communication cell selection in accordance with various aspects of the present disclosure.

Turning now to FIG. 6, a diagram 600 illustrates signaling between wireless communication devices, such as a base station 104 and a UE 102, for wireless communication cell selection in accordance with various aspects of the present disclosure. A single base station 104 and single UE 102 are described for purposes of simplicity of discussion only.

At action 602, the base station 104 sets one or more service availability indicators, referred to more generally as service availability information, in e.g. system information based on the availability of service support at the base station 104. For example, where a particular service becomes available at the base station 104, the base station 104 (e.g., by way of the cell selection module 308 discussed above with respect to FIG. 3) modifies the service availability information by setting a flag to TRUE for the now-available service, inserting service parameters, and/or other information into the system information.

At action 604, the base station 104 sends the service availability information as set at action 602 to the UE 102 (e.g., those UEs 102 that are within a coverage area 110 of the base station 104), for example as part of system information or a QCI.

At action 606, after the UE 102 has received the system information with the service availability information, the UE 102 (for example, by way of the cell selection module 208 as discussed above with respect to FIG. 2) analyzes the system information. The UE 102 may also obtain additional information from other cells, perform one or more measurements, compare the system information against one or more service requirements, and select a cell on which to camp based on the service-specific requirements and general network and radio condition information as available.

In this manner, FIG. 6 illustrates how service availability information is signaled to the UE 102.

Figure 7:
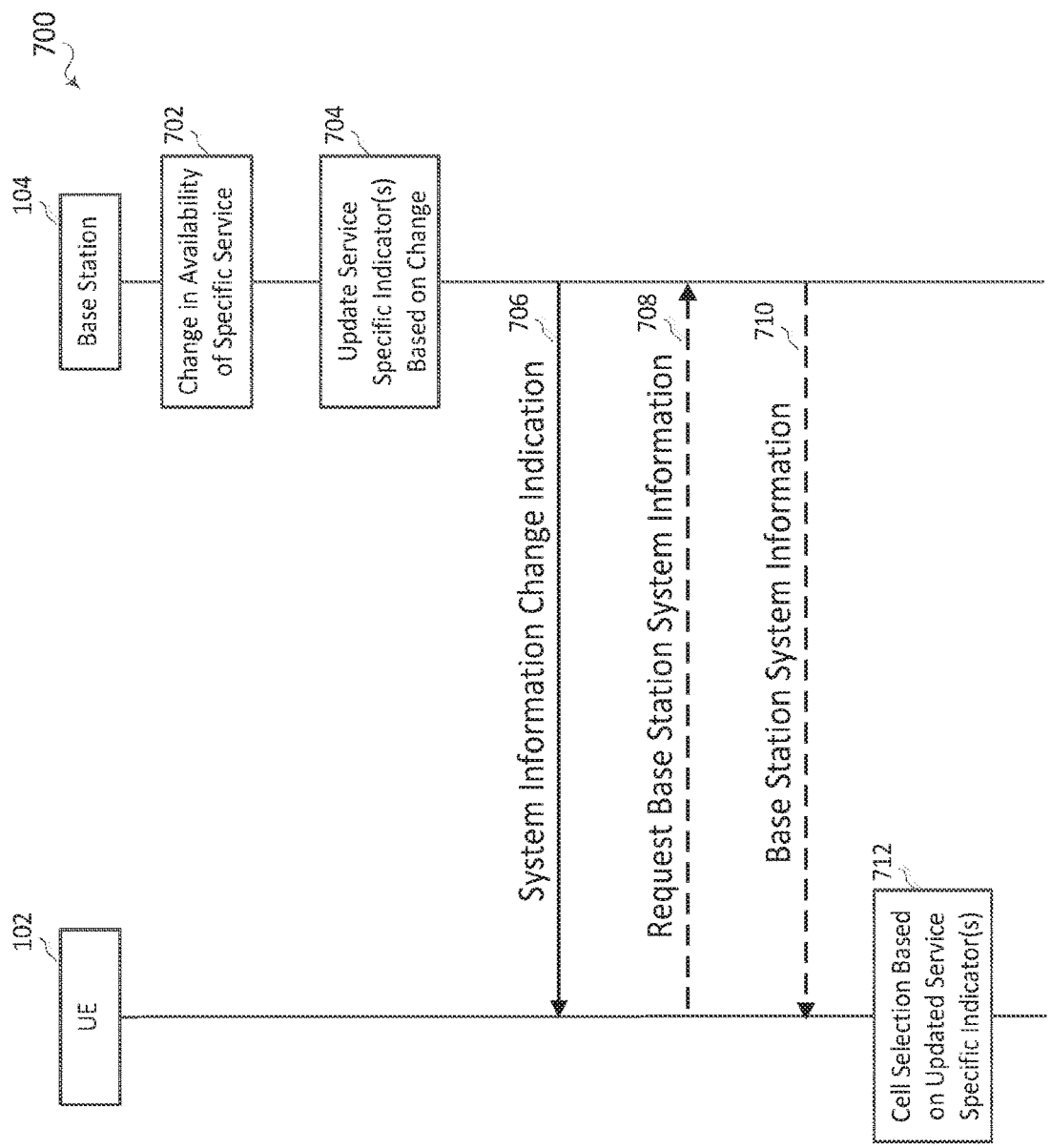
FIG. 7 is a diagram illustrating signaling between wireless communication devices, such as a base station and a user equipment, for wireless communication cell selection in accordance with various aspects of the present disclosure.

Turning now to FIG. 7, a diagram 700 illustrates signaling between wireless communication devices, such as a base station 104 and a UE 102, for wireless communication cell selection updates in accordance with various aspects of the present disclosure. In an embodiment, the actions associated with diagram 700 may occur after the actions discussed above with respect to FIG. 6.

At action 702, the base station 104 detects that a change has occurred that affects the availability of a service at the base station 104. For example, though a specific service may be generally available at the base station 104, at certain times the base station 104 may e.g. become congested so that the base station 104 can no longer serve the specific service (at least for a period of time).

At action 704, in response to the detected change, the base station 104 (for example, by way of the cell selection module 308) changes one or more service specific indicators of service availability information, for example in system information based on the detected change from action 702.

At action 706, the base station 104 sends a system information change indication to the UE 102 that is camped on the cell of the base station 104, in response to the change made to the system information at action 704.

At action 708, the UE 102 sends a request to the base station 104 to obtain the changed system information, in response to receiving the system information change indication transmitted at action 704.

In response, at action 710 the base station 104 sends the system information with the updated service availability information to the UE 102.

In an alternative embodiment to the actions described for actions 708 and 710, the UE 102 may initiate a system information acquisition procedure to acquire the system information from the base station 104, for example according to one or more intervals that the base station 104 uses to periodically broadcast its current system information. In embodiments where this is the case, action 708 may be omitted.

At action 712, the UE 102 takes this updated system information (whether obtained on-demand by the UE 102 or by the system information acquisition procedure) and again checks service availability for the specific service(s) the UE 102 needs support for, such as described above with respect to action 606 of FIG. 6, but with the updated system information. The UE 102 uses the results of this analysis to determine whether to stay camped on the selected cell or to perform cell selection/reselection to move to another cell where the service(s) is available and/or better served (e.g., with less congestion, better throughput, better SNR, etc.).

Figure 8:
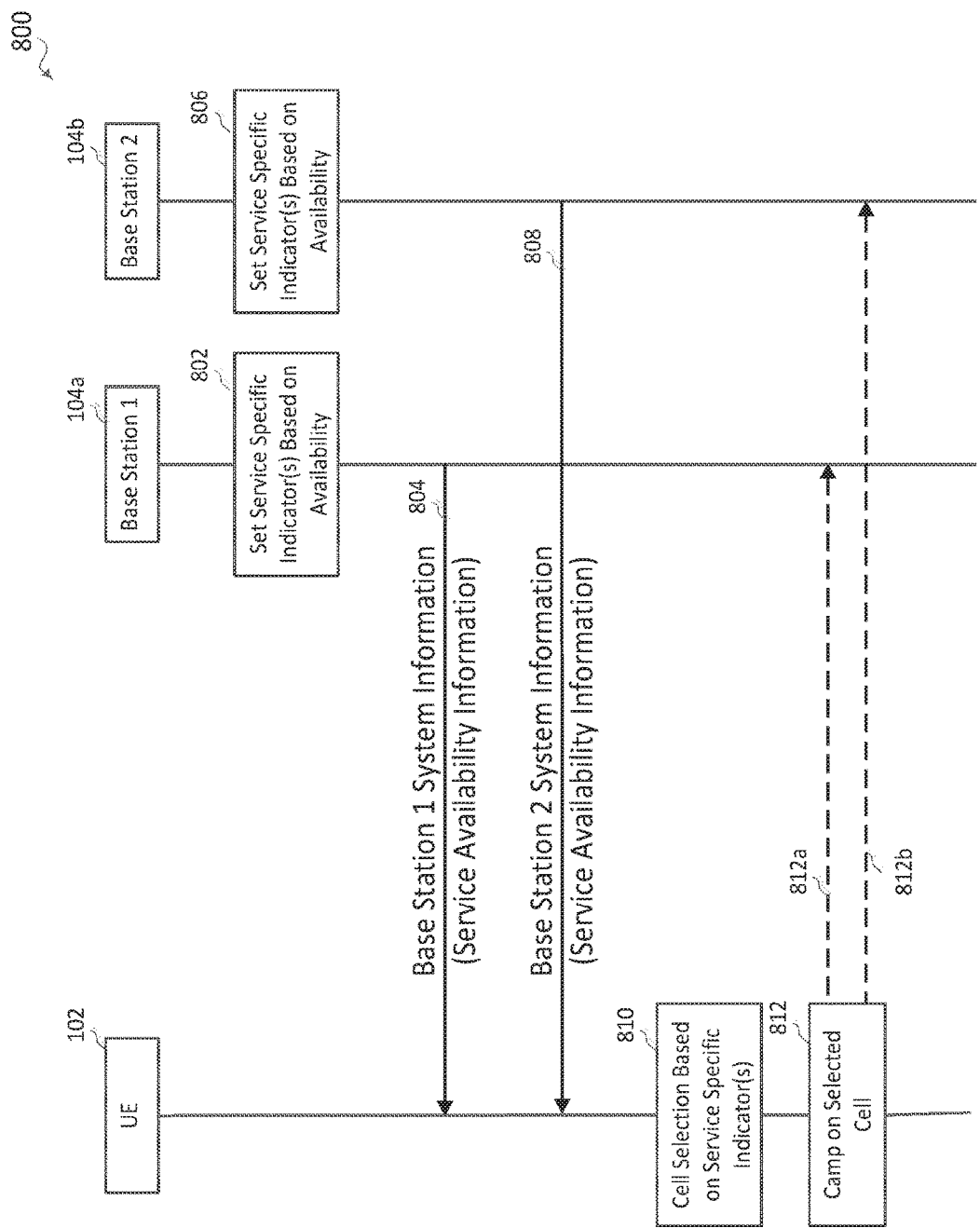
FIG. 8 is a diagram illustrating signaling between wireless communication devices, such as two base stations and a user equipment, for wireless communication cell selection in accordance with various aspects of the present disclosure.

FIG. 8 is a diagram 800 illustrating signaling between wireless communication devices, such as two base stations 104a, 104b and a UE 102, for wireless communication cell selection in accordance with various aspects of the present disclosure. Two base stations 104a, 104b are illustrated for simplicity of illustration only. As will be recognized, a UE 102 may be within coverage of the cells of any number of base stations 104 at a given time and may act according to the actions discussed below for FIG. 8.

At action 802, the base station 104a sets one or more service availability indicators, referred to more generally as service availability information, in e.g. system information based on the availability of service support at the base station 104a (e.g. as discussed above with respect to action 602 of FIG. 6).

At action 804, the base station 104a sends the service availability information as set at action 802 to the UE 102 (e.g., as discussed above with respect to action 604 of FIG. 6).

At action 806, the base station 104b sets one or more service availability indicators, referred to more generally as service availability information, in e.g. system information based on the availability of service support at the base station 104b (e.g. as discussed above with respect to action 602 of FIG. 6). Action 806 may occur before, during, or after the action 802.

At action 808, the base station 104b sends the service availability information as set at action 806 to the UE 102 (e.g., as discussed above with respect to action 604 of FIG. 6). The base station 104b may send the service availability information before action 804 or after action 804 (or, where supported by the UE 102, concurrent to action 804). In an embodiment, the base stations 104a, 104b may send service availability information as part of regular system information broadcasts (e.g., on one or more broadcast channels). In another embodiment, the base stations 104a, 104b may send the service availability information on demand responsive to a request by the UE 102.

At action 810, the UE 102 selects a cell to camp on based on the service-specific requirements available. In an embodiment where the UE 102 was already camped on a serving cell, such as associated with base station 104a, the UE 102 may first focus on determining whether the base station 104a fulfills the service requirements. In an alternative embodiment, the UE 102 may acquire the service availability information from multiple cells' base stations 104 and make a decision on which to camp based thereon. For example, after the UE 102 has received the system information with the service availability information from all (or a subset) of the base stations 104a, 104b (e.g., either by monitoring periodic broadcasts from the base stations 104a, 104b or by requesting the information), the UE 102 (for example, by way of the cell selection module 208 as discussed above with respect to FIG. 2) analyzes the system information from the base stations 104a, 104b. Under either alternative, the UE 102 may also perform one or more measurements, compare the system information against one or more service requirements, and select a cell from base station 104a, 104b on which to camp based on the service-specific requirements and general network and radio condition information as available.

At action 812, the UE 102 camps on the selected cell resulting from action 810. Action 812a illustrates the UE 102 camping on the cell of base station 104a, while action 812b illustrates the UE 102 camping on the cell of base station 104b.

Figure 9:
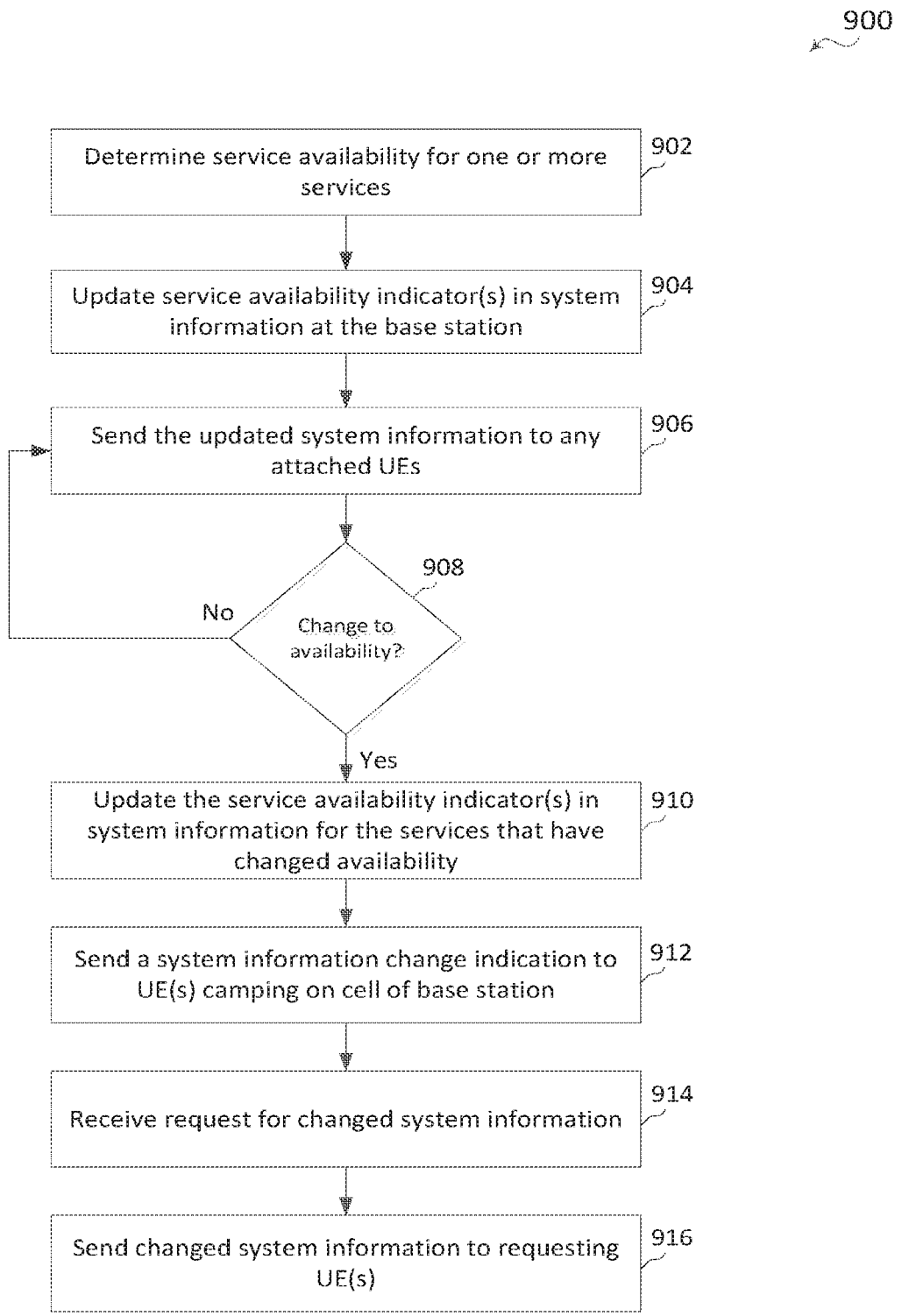
FIG. 9 is a flowchart illustrating an exemplary method for wireless communication in accordance with various aspects of the present disclosure.

FIG. 9 is a flowchart illustrating an exemplary method 900 for wireless communication in accordance with various aspects of the present disclosure. In particular, the method 900 illustrates the updating and provision of service availability information to UEs 102 to assist in the selection of service-specific cells for camping according to embodiments of the present disclosure. Method 500 may be implemented in a base station 104 (e.g., any discussed above with respect to FIGS. 1 and 3). Reference will be made to an exemplary base station 104 among any number in a given serving network. It is understood that additional steps can be provided before, during, and after the steps of method 900, and that some of the steps described can be replaced or eliminated from the method 900.

At block 902, the base station 104 determines the service availability for one or more services at the base station 104.

At block 904, the base station 104 sets the one or more service availability indicators corresponding to the determined service availability of the services from block 902. This may be set, for example, in system information at the base station 104.

At block 906, the base station 104 sends the service availability information as set to the UEs 102 that are within a coverage area 110 of the base station 104, for example as described above with respect to FIGS. 3 and 6. The transmission may be, in an example, part of system information, a RRC communication, or a NAS message with the UE 102.

At decision block 908, the base station 104 determines whether there has been a change in the availability of the determined services at the base station 104. For example, though a specific service may be generally available at the base station 104, at certain times the base station 104 may e.g. become congested so that the base station 104 can no longer serve the specific service (at least for a period of time). If the base station 104 determines that the availability has not changed, then the method 900 returns to block 906 to continue sending the system information with the service availability to UEs 102 as they search for cells to select and/or reselect.

If, however, the base station 104 determines that the availability of the one or more services has changed at the base station 104, then the method 900 proceeds to block 910.

At block 910, the base station 104 changes one or more service specific indicators of service availability information, for example in system information, based on the detected change.

At block 912, in response to the change to the system information, the base station 104 sends a system information change indication to the UE 102 that is camped on the cell of the base station 104, for example as described above with respect to FIG. 7.

At block 914, the base station 104 receives a request for the system information that reflects the change which triggered the message at block 912. This may correspond to an on-demand deployment scenario where the UE 102 may request system information on demand. In embodiments where the system information is broadcast from the base station 104 without receiving a request first from a UE 102, block 914 may be omitted.

At block 916, the base station 104 sends the system information with the updated service availability information to the UE 102 in response to the request received at block 914. Where the scenario is not on-demand (such that block 914 is omitted from method 900), at block 916 the base station 104 sends the system information with the updated service availability information in a broadcast, which in an embodiment the UE 102 is within range to receive and act on according to embodiments of the present disclosure.

The method 900 may continue again back to block 906 and as discussed above with respect to the other blocks in FIG. 9.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). It is also contemplated that the features, components, actions, and/or steps described with respect to one embodiment may be structured in different order than as presented herein and/or combined with the features, components, actions, and/or steps described with respect to other embodiments of the present disclosure.

Embodiments of the present disclosure include an apparatus comprising means for determining, by the apparatus, one or more operating parameters of a cell needed to support a service of the apparatus. The apparatus further comprises means for receiving, at the apparatus, a communication from a first wireless communication device, the communication including at least one service indicator for a first cell. The apparatus further comprises means for determining, by the apparatus, whether to select the first cell for camping based at least in part on the at least one service indicator for the first cell and the one or more operating parameters.

The apparatus further comprises wherein the means for determining, by the apparatus, whether to select the first cell for camping includes means for determining whether the first cell satisfies the one or more operating parameters needed to support the service of the apparatus based on the at least one service indicator. The apparatus further comprises wherein the one or more operating parameters include one or more of carrier aggregation, dual connectivity, radio access technology, operating frequency, asynchronous data transfer, latency, or quality of service class. The apparatus further comprises means for camping on the first cell in response to determining that the first cell satisfies the one or more operating parameters. The apparatus further comprises wherein the first wireless communication device is associated with the first cell. The apparatus further comprises wherein the first wireless communication device is associated with a second cell different than the first cell. The apparatus further comprises wherein the at least one service indicator includes a service availability indicator that includes at least one of a flag indicating whether the service is available on the first cell, one or more operating parameters for the service on the first cell, a quality of service class identifier (QCI), or a mode of the service on the first cell. The apparatus further comprises wherein the service availability indicator is received as part of at least one of a system information communication or unicast message comprising a radio resource control (RRC) communication or a non-access stratum (NAS) message. The apparatus further comprises wherein the communication further includes at least one service indicator for a second cell, the apparatus further comprising means for determining whether the second cell satisfies the one or more operating parameters needed to support the service of the apparatus based on the at least one service indicator for the second cell, and means for ignoring the second cell in response to determining that the second cell does not satisfy the one or more operating parameters. The apparatus further comprises wherein the at least one service indicator includes a service area indicator. The apparatus further comprises wherein the service area indicator includes an indicator for at least one of a public land mobile network, a tracking area, a zone, or a cell. The apparatus further comprises wherein the service area indicator identifies a plurality of cells having the same service availability. The apparatus further comprises means for performing the determination of the one or more operating parameters of the cell needed to support the service of the apparatus in response to activation of the service of the apparatus by an upper layer of the apparatus or a user of the apparatus. The apparatus further comprises wherein the one or more operating parameters of the cell needed to support the service of the apparatus are prioritized over default cell selection parameters. The apparatus further comprises means for receiving, from the first wireless communication device, policy information about available access networks, and means for configuring the one or more operating parameters to reflect one or more parameters needed to support the service based on the received policy information.

Embodiments of the present disclosure further include an apparatus comprising means for setting, at the apparatus, a value for at least one service indicator for a first cell. The apparatus further comprises means for transmitting, from the apparatus to a user equipment (UE), a communication that includes the at least one service indicator for the first cell such that the UE can determine whether to select the first cell for camping based at least in part on whether the first cell satisfies one or more operating parameters needed to support a service of the UE based on the at least one service indicator.

The apparatus further comprises wherein the one or more operating parameters include one or more of carrier aggregation, dual connectivity, radio access technology, operating frequency, asynchronous data transfer, latency, or quality of service class. The apparatus further comprises wherein the UE camps on the first cell in response to determining that the first cell satisfies the one or more operating parameters. The apparatus further comprises wherein the apparatus is associated with the first cell. The apparatus further comprises wherein the apparatus is associated with a second cell different than the first cell. The apparatus further comprises wherein the at least one service indicator includes a service availability indicator that includes at least one of a flag indicating whether the service is available on the first cell, one or more operating parameters for the service on the first cell, a quality of service class indicator (QCI), or a mode of the service on the first cell. The apparatus further comprises means for transmitting the service indicator as part of at least one of a system information communication or a unicast message comprising a radio resource control (RRC) communication or a non-access stratum (NAS) message. The apparatus further comprises wherein the at least one service indicator includes a service area indicator. The apparatus further comprises wherein the service area indicator includes an indicator for at least one of a public land mobile network, a tracking area, a zone, or a cell. The apparatus further comprises wherein the service area indicator identifies a plurality of cells having the same service availability. The apparatus further comprises means for updating, at the apparatus, the value for the at least one service indicator for the first cell in response to a change in service availability, and means for transmitting, from the apparatus to the UE, a communication that indicates the change in service availability. The apparatus further comprises wherein the communication that indicates the change in service availability includes the updated value for the at least one service indicator. The apparatus further comprises means for determining a change in load at the first cell, wherein the change in service availability comprises the determined change in load at the first cell. The apparatus further comprises means for receiving, at the apparatus, a request from the UE for updated system information, and means for transmitting, from the apparatus to the UE in response to receiving the request from the UE, a communication that includes the updated value for the at least one service indicator such that the UE can determine whether to select the first cell for camping based at least in part on whether the first cell satisfies one or more operating parameters needed to support the service of the UE based on the updated value for the at least one service indicator.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:
1. A method of wireless communication, comprising:
setting, at a wireless communication device, a value for at least one service indicator for a cell;
transmitting, from the wireless communication device to a user equipment (UE), a first communication that includes the at least one service indicator for the cell;
receiving, at the wireless communication device, a second communication from the UE indicating whether the UE selected the cell for camping based at least in part on whether the cell satisfies one or more operating parameters needed to support a service of the UE based on the at least one service indicator;
receiving, at the wireless communication device, a request from the UE for updated system information;
transmitting, from the wireless communication device to the UE in response to the request, a third communication that includes an updated value for the at least one service indicator; and
receiving, at the wireless communication device, a fourth communication from the UE indicating whether the UE selected the cell for camping based at least in part on whether the cell satisfies the one or more operating parameters needed to support the service of the UE based on the updated value for the at least one service indicator.

2. The method of claim 1, wherein:
the one or more operating parameters include one or more of carrier aggregation, dual connectivity, radio access technology, operating frequency, asynchronous data transfer, latency, or quality of service class; and the at least one service indicator includes a service availability indicator that includes at least one of a flag indicating whether the service is available on the cell, one or more operating parameters for the service on the cell, a quality of service class identifier (QCI), or a mode of the service on the cell.

3. The method of claim 1, wherein the service indicator is transmitted as part of at least one of a system information communication or unicast message comprising a radio resource control (RRC) communication or a non-access stratum (NAS) message.

4. The method of claim 1, wherein the at least one service indicator includes a service area indicator that identifies a plurality of cells having the same service availability.

5. The method of claim 1, further comprising:
updating, at the wireless communication device, the value for the at least one service indicator for the cell in response to a change in service availability; and
transmitting, from the wireless communication device to the UE, a fifth communication that indicates the change in service availability.

6. The method of claim 5, further comprising:
determining a change in load at the cell, wherein the change in service availability comprises the determined change in load at the cell.

7. An apparatus, comprising:
a processor configured to set a value for at least one service indicator for a cell; and
a transceiver configured to:
transmit, to a user equipment (UE), a first communication that includes the at least one service indicator for the cell,
receive, from the UE, a second communication indicating whether the UE selected the cell for camping based at least in part on whether the cell satisfies one or more operating parameters needed to support a service of the UE based on the at least one service indicator,
receive a request from the UE for updated system information,
transmit, to the UE in response to the request, a third communication that includes an updated value for the at least one service indicator, and
receive, from the UE, a fourth communication indicating whether the UE selected the cell for camping based at least in part on whether the cell satisfies the one or more operating parameters needed to support a service of the UE based on the updated value for the at least one service indicator.

8. The apparatus of claim 7, wherein:
the one or more operating parameters include one or more of carrier aggregation, dual connectivity, radio access technology, operating frequency, asynchronous data transfer, latency, or quality of service class, and
the at least one service indicator includes a service availability indicator that includes at least one of a flag indicating whether the service is available on the cell, one or more operating parameters for the service on the cell, a quality of service class identifier (QCI), or a mode of the service on the cell.

9. The apparatus of claim 7, wherein the service indicator is transmitted as part of at least one of a system information communication or a unicast message comprising a radio resource control (RRC) communication or a non-access stratum (NAS) message.

10. The apparatus of claim 7 wherein the at least one service indicator includes a service area indicator that identifies a plurality of cells having the same service availability.

11. The apparatus of claim 7, wherein the processor is further configured to:
update the value for the at least one service indicator for the cell in response to a change in service availability; and
transmit, to the UE, a fifth communication that indicates the change in service availability.

12. The apparatus of claim 11, wherein the processor is further configured to determine a change in load at the cell, wherein the change in service availability comprises the determined change in load at the cell.

13. A computer-readable medium having program code recorded thereon, the program code comprising:
code for causing a wireless communication device to set a value for at least one service indicator for a cell; and
code for causing the wireless communication device to transmit, to a user equipment (UE), a first communication that includes the at least one service indicator for the cell; and
code for causing the wireless communication device to receive, from the UE, a second communication indicating whether the UE selected the cell for camping based at least in part on whether the cell satisfies one or more operating parameters needed to support a service of the UE based on the at least one service indicator;
code for causing the wireless communication device to receive a request from the UE for updated system information;
code for causing the wireless communication device to transmit to the UE, in response to the request, a third communication that includes an updated value for the at least one service indicator; and
code for causing the wireless communication device to receive, from the UE, a fourth communication indicating whether the UE selected the cell for camping based at least in part on whether the cell satisfies the one or more operating parameters needed to support a service of the UE based on the updated value for the at least one service indicator.

14. The computer-readable medium of claim 13, wherein:
the one or more operating parameters include one or more of carrier aggregation, dual connectivity, radio access technology, operating frequency, asynchronous data transfer, latency, or quality of service class, and
the at least one service indicator includes a service availability indicator that includes at least one of a flag indicating whether the service is available on the cell, one or more configuration parameters for the service on the cell, a quality of service class identifier (QCI), or a mode of the service on the cell.

15. The computer-readable medium of claim 13, wherein the service indicator is transmitted as part of at least one of a system information communication or unicast message comprising a radio resource control (RRC) communication or a non-access stratum (NAS) message.

16. The computer-readable medium of claim 13, further comprising:
code for causing the wireless communication device to update the value for the at least one service indicator for the cell in response to a change in service availability; and
code for causing the wireless communication device to transmit, to the UE, a fifth communication that indicates the change in service availability.

17. The computer-readable medium of claim 16, further comprising:

code for causing the wireless communication device to determine a change in load at the cell, wherein the change in service availability comprises the determined change in load at the cell.

\* \* \* \* \*